United States Patent

Yokoyama et al.

(10) Patent No.: US 12,473,040 B2
(45) Date of Patent: Nov. 18, 2025

(54) DEFLECTOR DEVICE

(71) Applicant: KABUSHIKI KAISHA TOKAI-RIKA-DENKI-SEISAKUSHO, Aichi-ken (JP)

(72) Inventors: Kazuyuki Yokoyama, Aichi (JP); Masahide Inayama, Aichi (JP); Daisuke Nakayama, Aichi (JP); Nobuhiro Kudo, Aichi (JP); Toshiya Ito, Aichi (JP); Kazunori Tanaka, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 227 days.

(21) Appl. No.: 18/159,182

(22) Filed: Jan. 25, 2023

(65) Prior Publication Data

US 2023/0242192 A1 Aug. 3, 2023

(30) Foreign Application Priority Data

Feb. 1, 2022 (JP) .................. 2022-014378

(51) Int. Cl.
*B62D 35/00* (2006.01)
*B62D 35/02* (2006.01)

(52) U.S. Cl.
CPC ........... *B62D 35/005* (2013.01); *B62D 35/02* (2013.01)

(58) Field of Classification Search
CPC ....... B62D 35/00; B62D 35/005; B62D 35/02

USPC ................. 296/180.1, 180.2, 180.3
See application file for complete search history.

(56) References Cited

U.S. PATENT DOCUMENTS

| 4,904,016 | A | 2/1990 | Tatsumi et al. | |
| 10,081,400 | B2 * | 9/2018 | Abdoul Azizou | ..... B62D 35/02 |
| 10,625,792 | B2 * | 4/2020 | Shiga | ................... B62D 35/005 |
| 10,946,909 | B2 * | 3/2021 | Andre | ...................... G05G 5/06 |
| 10,953,933 | B2 * | 3/2021 | Schmitt | ............... B62D 35/005 |
| 10,981,611 | B2 * | 4/2021 | Matthews | ........... B62D 35/005 |
| 11,052,954 | B2 * | 7/2021 | Shiga | .................. B62D 37/02 |
| 11,161,557 | B2 * | 11/2021 | Urbach | ................ B62D 35/005 |
| 2017/0101136 | A1 * | 4/2017 | Zielinski | ................ B62D 35/02 |
| 2017/0120968 | A1 | 5/2017 | Povinelli et al. | |
| 2018/0298953 | A1 * | 10/2018 | Andre | ..................... F16D 7/048 |
| 2020/0094889 | A1 * | 3/2020 | Shiga | .................. B62D 35/005 |

FOREIGN PATENT DOCUMENTS

FR 3103166 A1 * 5/2021 .......... B62D 35/005
JP H0390485 A 4/1991

OTHER PUBLICATIONS

English translation of FR 3103166; retrieved via PatentTranslate located at www.epo.org. (Year: 2025).*
Japanese Office Action (w/English translation) for corresponding Application No. 2022-014378, mailed Oct. 7, 2025, 9 pages.

* cited by examiner

*Primary Examiner* — Jason S Daniels
(74) *Attorney, Agent, or Firm* — Dority & Manning, P.A.

(57) ABSTRACT

In a deflector device, a deflector body is rotated with respect to a case. A restriction plate of the case covers a divide between the deflector body and the case. Foreign matter is accordingly suppressed from ingression between the deflector body and the case by the restriction plate.

10 Claims, 6 Drawing Sheets

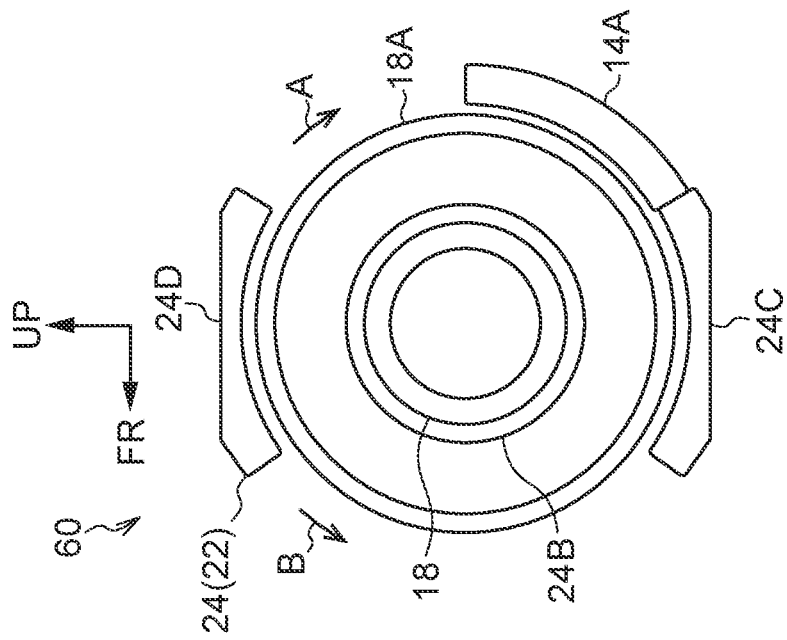
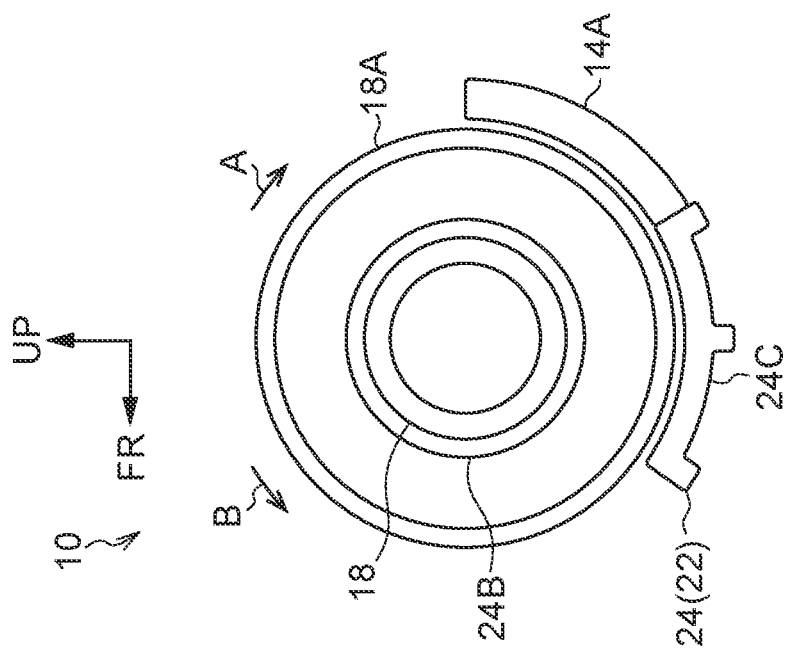

DEFLECTOR DEVICE

CROSS-REFERENCE TO RELATED APPLICATION

This application is based on and claims priority under 35 USC 119 from Japanese Patent Application No. 2022-14378 filed on Feb. 1, 2022, the disclosure of which is incorporated by reference herein.

BACKGROUND

Technical Field

The present invention relates to a deflector device that suppresses airflow onto a front wheel of a vehicle

Related Art

In an active front deflector described in the specification of US patent application laid-open No. 2017/0120968, an actuator is rotatably supported by a deflector panel (including a link mechanism).

There is a desire with such active front deflectors to be able to suppress foreign matter ingression between the actuator and the deflector panel (including the link mechanism).

SUMMARY

In consideration of the above circumstances, an object of the present invention is to obtain a deflector device capable of suppressing ingression of foreign matter between a deflector body and a support body.

A deflector device according to a first aspect of the present invention includes a deflector body configured to be deployed in front of a front wheel of a vehicle by being rotated in a deploy direction to suppress airflow onto the front wheel and configured to be stowed in a vehicle body by being rotated in a stow direction, a support body configured to rotatably support the deflector body, and a cover portion provided at the support body and covering a divide between the deflector body and the support body.

In the deflector device of the first aspect of the present invention, the deflector body is deployed at the front side of the front wheel of the vehicle by the deflector body being rotated in the deploy direction, and airflow onto the front wheel is suppressed. Moreover, the deflector body is stowed in the vehicle body by the deflector body being rotated in the stow direction. The support body also rotatably supports the deflector body.

The cover portion of the support body covers the divide between the deflector body and the support body. This thereby enables foreign matter to be suppressed from ingression between the deflector body and the support body by the cover portion.

A deflector device of a second aspect of the present invention is the deflector device of the first aspect of the present invention, wherein the cover portion restricts rotation of the deflector body.

In a deflector device of the second aspect of the present invention, the cover portion restricts rotation of the deflector body. This thereby enables rotation of the deflector body to be restricted by the cover portion.

A deflector device of a third aspect of the present invention is the deflector device of the first aspect of the second aspect of the present invention, wherein the cover portion extends as far as onto a deflector body side of the divide between the deflector body and the support body.

In the deflector device of the third aspect of the present invention, the cover portion extends as far as onto the deflector body side of the divide between the deflector body and the support body. This accordingly enables foreign matter to be effectively suppressed from ingression between the deflector body and the support body by the cover portion.

A deflector device of a fourth aspect of the present invention is a deflector device of any one of the first aspect to the third aspect of the present invention, wherein the cover portion is disposed above the divide between the deflector body and the support body.

In the deflector device of the fourth aspect of the present invention, the cover portion is disposed above the divide between the deflector body and the support body. This enables foreign matter to be suppressed from ingression between the deflector body and the support body from above by the cover portion.

A deflector device of a fifth aspect of the present invention is the deflector device of any one of the first aspect to the fourth aspect of the present invention, further including a rotation portion that covers the divide between the deflector body and the support body and that is rotated by the deflector body being rotated.

In the deflector device of the fifth aspect of the present invention, the rotation portion is rotated by the deflector body being rotated.

The rotation portion covers the divide between the deflector body and the support body. This accordingly enables foreign matter to be suppressed from ingression between the deflector body and the support body by the rotation portion.

A deflector device of a sixth aspect of the present invention is the deflector device of the fifth aspect of the present invention, wherein the rotation portion is able to fit together with the cover portion.

In the deflector device of the sixth aspect of the present invention, the rotation portion is able to fit together with the cover portion. Thus due to the rotation portion fitting together with the cover portion, foreign matter is accordingly able to be effectively suppressed from ingression between the deflector body and the support body by the cover portion and the rotation portion.

A deflector device of a seventh aspect of the present invention is the deflector device of the fifth aspect or the sixth aspect of the present invention, wherein the rotation portion extends as far as onto a support body side of the divide between the deflector body and the support body.

In the deflector device of the seventh aspect of the present invention, the rotation portion extends as far as onto the support body side of the divide between the deflector body and the support body. Foreign matter is accordingly effectively suppressed from ingression between the deflector body and the support body by the rotation portion.

A deflector device of an eighth aspect of the present invention is the deflector device of any one of the fifth aspect to the seventh aspect of the present invention, wherein the rotation portion is disposed above the divide between the deflector body and the support body.

In the deflector device of the eighth aspect of the present invention, the rotation portion is disposed above the divide between the deflector body and the support body. This accordingly enables foreign matter to be suppressed from ingression between the deflector body and the support body from above by the rotation portion.

BRIEF DESCRIPTION OF THE DRAWINGS

Exemplary embodiments of the present invention will be described in detail based on the following figures, wherein:

FIG. 6A is a cross-section illustrating the deflector device according to the exemplary embodiment of the present invention, as viewed from a vehicle width direction inside (a cross-section along line 6-6 of FIG. 4); and FIG. 6B is a cross-section of a deflector device according to a modified example of the exemplary embodiment of the present invention, as viewed from the vehicle width direction inside (a cross-section at the position of line 6-6 of FIG. 4).

DETAILED DESCRIPTION

Figure 1:
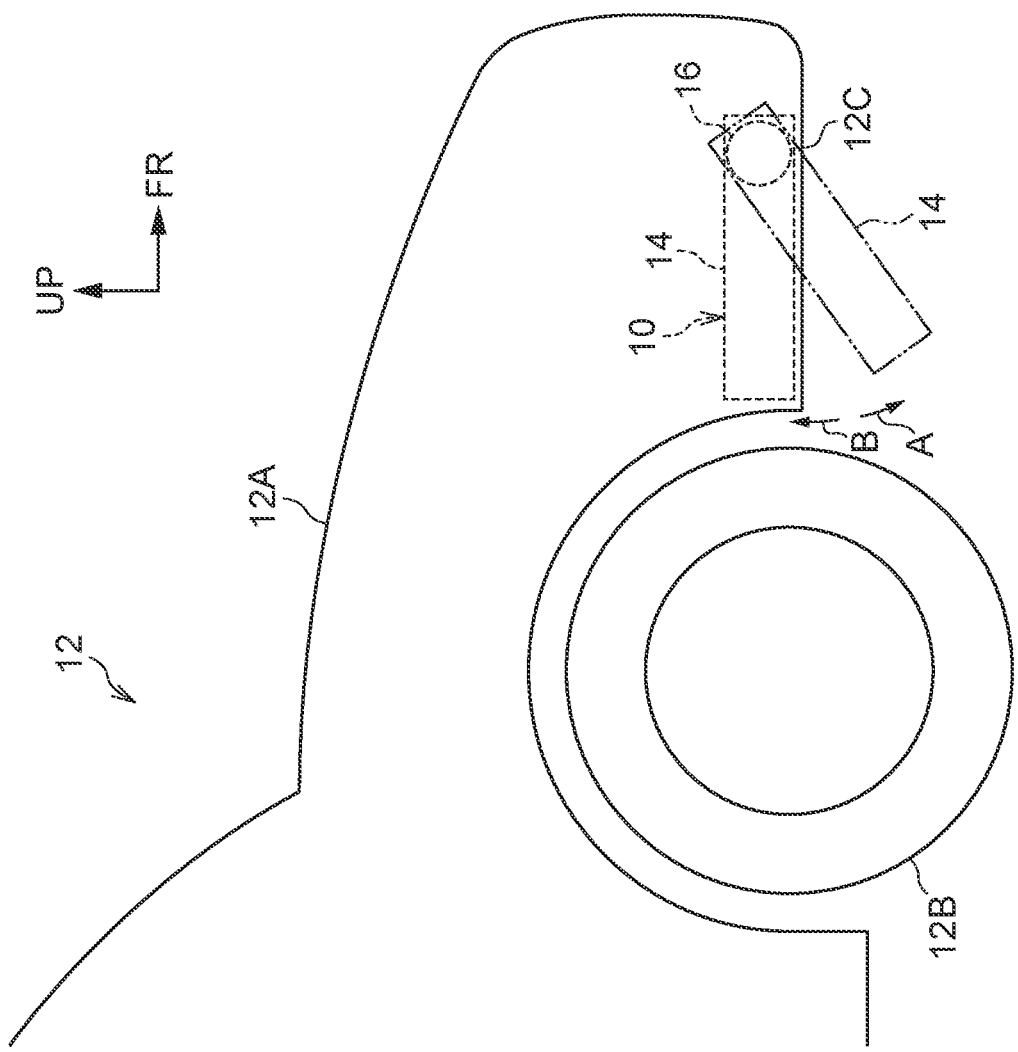
FIG. 1 is a side view illustrating a front section of a vehicle in an exemplary embodiment of the present invention, as viewed from a vehicle width direction outside.
Figure 2:
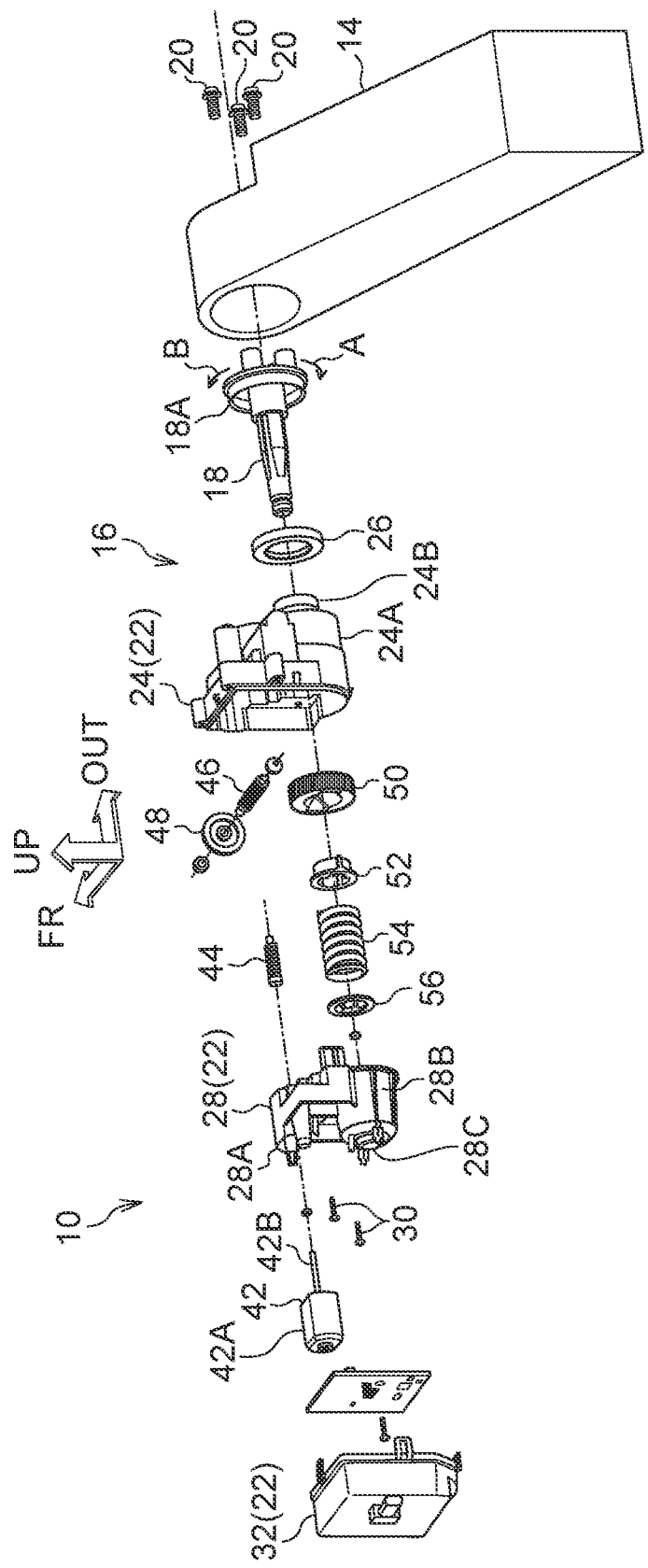
FIG. 2 is an exploded perspective view illustrating a deflector device according to the exemplary embodiment of the present invention, as viewed from a vehicle rear side and vehicle width direction inside.
Figure 3:
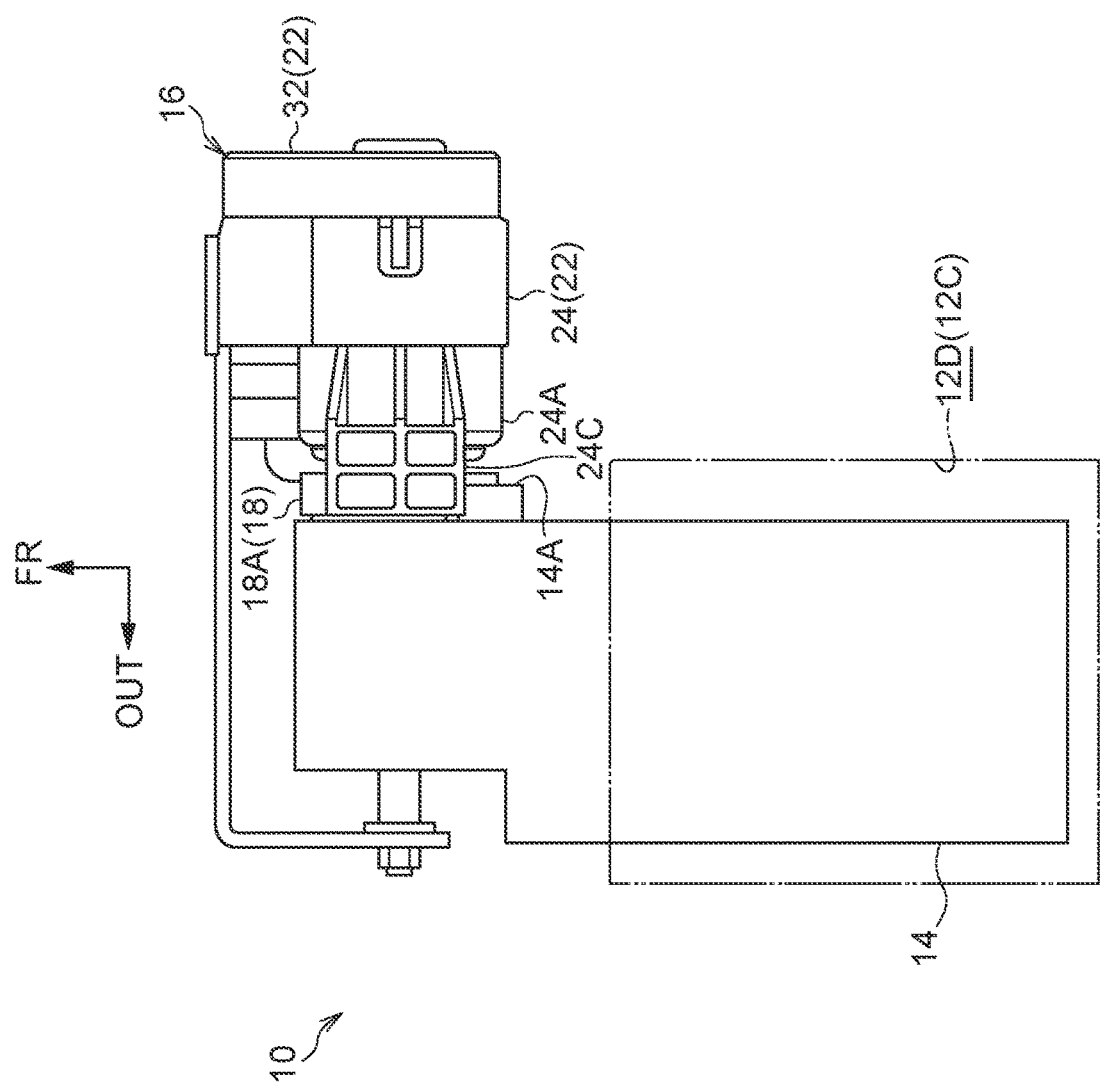
FIG. 3 is a bottom view illustrating the deflector device according to the exemplary embodiment of the present invention, as viewed from below.
Figure 4:
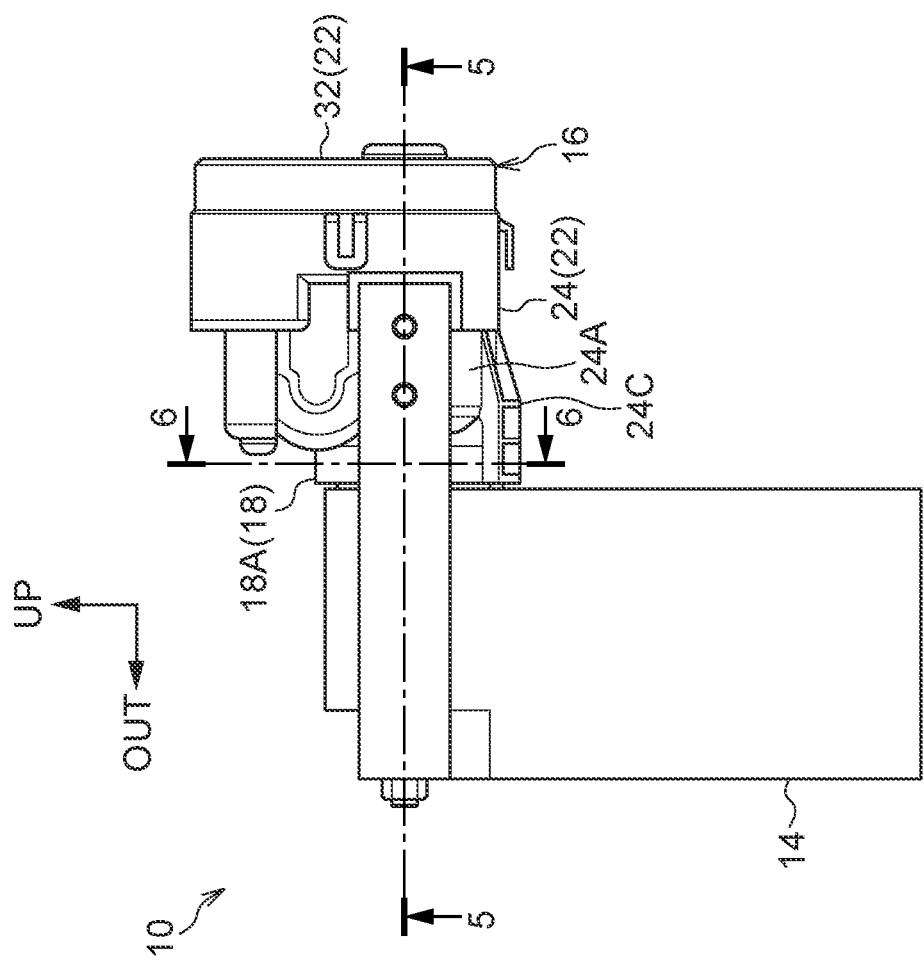
FIG. 4 is a front view illustrating the deflector device according to the exemplary embodiment of the present invention, as viewed from a vehicle front side.

FIG. 1 is a side view illustrating a front section of a vehicle 12 in an exemplary embodiment, as viewed from a vehicle width direction outside (vehicle right side), and FIG. 2 is an exploded perspective view illustrating a deflector device 10 according to the present exemplary embodiment, as viewed from a vehicle rear side and vehicle width direction inside. Furthermore, FIG. 3 is a bottom view illustrating the deflector device 10, as viewed from below, and FIG. 4 is a front view illustrating the deflector device 10, as viewed from a vehicle front side. Note that in the drawings an arrow FR indicates a vehicle front side, an arrow OUT indicates a vehicle width direction outside, and an arrow UP indicates upward.

As illustrated in FIG. 1, the deflector device 10 according to the present exemplary embodiment is installed inside a front end portion of a vehicle body 12A, and is disposed at a front side of a front wheel 12B of a vehicle 12. A lower face (bottom face) of the vehicle body 12A is covered by a cover 12C having a plate shape, and a deployment hole 12D (see FIG. 3) having a substantially rectangular shape is formed piercing through the cover 12C at a lower side of the deflector device 10.

As illustrated in FIG. 1 to FIG. 4, a deflector body 14 made from resin in a substantially cuboidal box shape and serving as a deflection section is provided to the deflector device 10, with the deflector body 14 rotatable in a deploy direction A and a stow direction B so as to be capable of being disposed at a deployed position (the double-dot broken line position in FIG. 1) and at a stowed position (the broken line position in FIG. 1). When the deflector body 14 has been disposed in the deployed position, the deflector body 14 protrudes through the deployment hole 12D of the cover 12C and below the vehicle body 12A.

Figure 5:
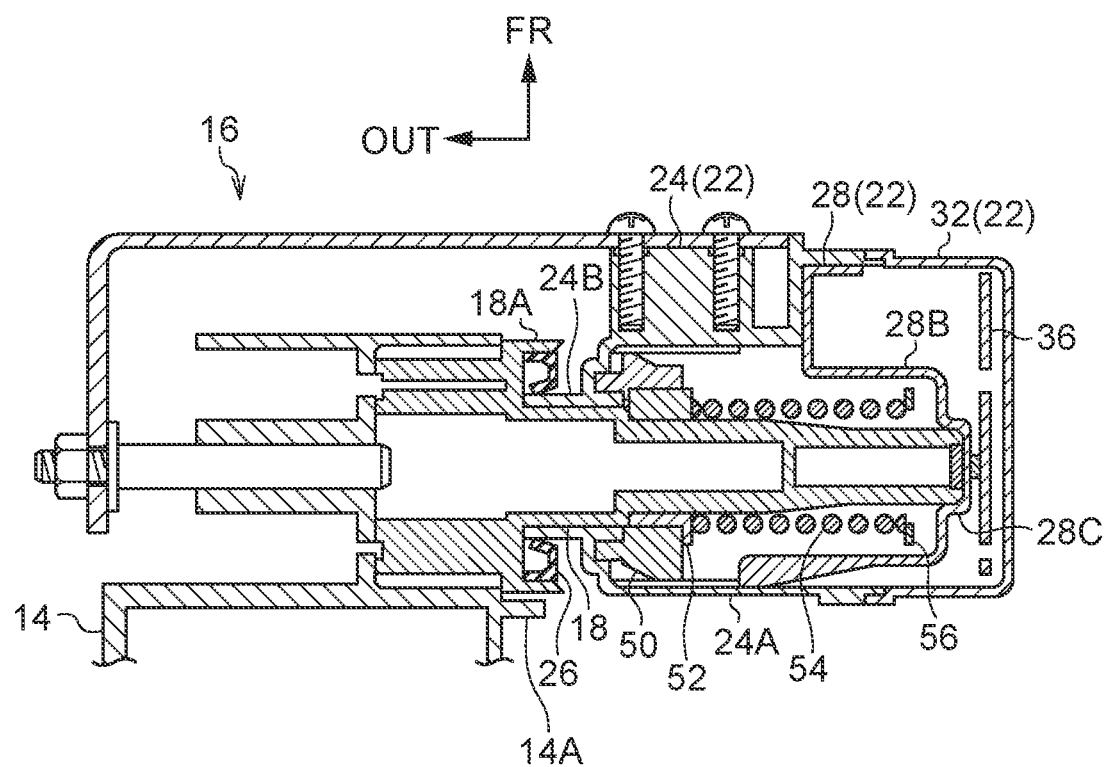
FIG. 5 is a cross-section illustrating the deflector device according to the exemplary embodiment of the present invention, as viewed from below (a cross-section along line 5-5 of FIG. 4)

A rotation plate 14A (see FIG. 5 and FIG. 6A) having a curved rectangular shape and serving as a rotation portion is integrally formed to a vehicle front side end portion of the deflector body 14 at a vehicle rear side of a rotation center axis of the deflector body 14, with the rotation plate 14A protruding toward the vehicle width direction inside and curved along a rotation circumferential direction of the deflector body 14.

A drive device 16 (see FIG. 2 and FIG. 5) is attached to a vehicle width direction inside of a vehicle front side end portion of the deflector body 14, with the drive device 16 being fixed inside the front end portion of the vehicle body 12A.

A stand 18 made from resin in a substantially circular cylinder shape and serving as a rotation shaft is provided to the drive device 16. An axial direction of the stand 18 is oriented along the vehicle width direction, and the deflector body 14 is joined (fastened) to a vehicle width direction outside end portion of the stand 18 by a specific number (three in the present exemplary embodiment) of joining screws 20. The stand 18 configures the deflector body 14, and the deflector body 14 is configured so as to be capable of rotating about a center axis of the stand 18.

A seal tube 18A having a circular ring shape and serving as a sealing section is integrally formed coaxially in the vicinity of a vehicle width direction outside end portion of the stand 18, with the seal tube 18A having an L-shaped cross-section and provided with a bottom wall and a side wall. The bottom wall of the seal tube 18A has a circular ring plate shape and is formed as a single body with the stand 18. The side wall of the seal tube 18A has a circular cylinder shape that protrudes out toward the vehicle width direction inside from a radial direction outside end portion of the bottom wall of the seal tube 18A. The rotation plate 14A of the deflector body 14 is disposed in the vicinity of the radial direction outside of the side wall of the seal tube 18A, with the rotation plate 14A curved along the side wall of the seal tube 18A.

A case 24 made from resin in a box shape and serving as a support member configuring a support body 22 is provided at the vehicle width direction inside of the stand 18, with the inside of the case 24 open toward the vehicle width direction inside. A housing tube 24A having a substantially bottomed circular cylinder shape is formed at a lower portion of the case 24, with the housing tube 24A having an axial direction oriented in the vehicle width direction and having an interior communicated with an upper portion of the case 24 interior. A support tube 24B having a circular cylinder shape and serving as a first support section is integrally formed coaxially to a bottom wall (vehicle width direction outside wall) of the housing tube 24A, with the support tube 24B piercing the bottom wall of the housing tube 24A and having an interior open toward the vehicle width direction outside.

The stand 18 is coaxially fitted into the support tube 24B, such that the support tube 24B rotatably supports the stand 18, and the stand 18 is coaxially inserted into the housing tube 24A. The bottom wall of the seal tube 18A of the stand 18 is abutted against the support tube 24B from the vehicle width direction outside, such that movement of the stand 18 toward the vehicle width direction inside is stopped thereby and such that a gap is formed between the bottom wall of the housing tube 24A and the side wall of the seal tube 18A. A seal ring 26 having a circular ring shape and serving as a seal member is inserted between the support tube 24B and the seal tube 18A, with the seal ring 26 made from rubber and having sealing properties. The seal ring 26 is sandwiched and elastically compressed between the support tube 24B and the side wall of the seal tube 18A, with the seal ring 26 sealing between the case 24 and the stand 18 and limiting the ingression of water into the case 24.

A restriction plate 24C (see FIG. 3, FIG. 4, and FIG. 6A) having a substantially curved rectangular plate shape and serving as a cover portion is integrally formed to a lower portion of the housing tube 24A of the case 24, with the restriction plate 24C curved along the circumferential direction of the housing tube 24A. The restriction plate 24C protrudes toward the vehicle width direction outside and is disposed in the vicinity of a radial direction outside of the seal tube 18A side wall of the stand 18, and extends as far as a vehicle width direction outside end of the seal tube 18A side wall, with the restriction plate 24C curved along the side wall of the seal tube 18A. The deploy direction A side face of the rotation plate 14A of the deflector body 14 is abutted by the stow direction B side face of the restriction plate 24C when the deflector body 14 has been rotated to the deployed position, such that further rotation of the rotation plate 14A is restricted in the deploy direction A, and rotation of the deflector body 14 is restricted in the deploy direction A.

A motor base 28 made from resin and serving as a retention member configuring the support body 22 is housed inside the case 24, with the outer periphery of the motor base 28 fitting together with the inner periphery of the case 24. A pair of fixing screws 30 are passed through up-down direction intermediate portions of the motor base 28, and the pair of fixing screws 30 are screwed into the bottom wall (vehicle width direction outside wall) of the case 24 such that the motor base 28 is fixed (fastened) to the case 24.

A retaining tube 28A having a bottomed substantially elliptical tube shape and serving as a retention section is integrally formed to an upper portion of the motor base 28, with the retaining tube 28A protruding toward the vehicle width direction inside and having an interior open toward the vehicle width direction inside.

An insertion tube 28B having a bottomed substantially circular cylinder shape and serving as an insertion portion is integrally formed to a lower portion of the motor base 28, with the insertion tube 28B protruding toward the vehicle width direction inside and having an interior open toward the vehicle width direction outside. The insertion tube 28B is disposed coaxially to the housing tube 24A of the case 24, and the stand 18 is inserted coaxially into the insertion tube 28B. A fitting tube 28C having a bottomed substantially circular cylinder shape and serving as a second support section (fitting section) is integrally formed coaxially to the bottom wall (vehicle width direction inside wall) of the insertion tube 28B, with the fitting tube 28C protruding from the bottom wall of the insertion tube 28B toward the vehicle width direction inside. The inside of the fitting tube 28C opens into the insertion tube 28B, with a vehicle width direction inside end portion of the stand 18 coaxially fitted into the fitting tube 28C, such that the fitting tube 28C rotatably supports the stand 18.

A cover 32 made from resin in a box shape and serving as a cover member configuring the support body 22 is provided at the vehicle width direction inside of the case 24 and the motor base 28, with the inside of the cover 32 open toward the vehicle width direction outside. A vehicle width direction inside end portion of the case 24 is fitted into and fixed to a vehicle width direction outside end portion of the cover 32, with the cover 32 covering and sealing the vehicle width direction inside of the case 24 and the motor base 28.

The case 24 and the cover 32 are fixed inside a front end portion of the vehicle body 12A, with the deflector device 10 thereby installed inside the front end portion of the vehicle body 12A.

A motor 42 serving as a drive mechanism is provided to an upper portion of the interior of the case 24 and the cover 32. A body section 42A having substantially elliptical pillar shaped is provided to the motor 42, with the body section 42A fitted inside a retention tube 28A of the motor base 28 from the vehicle width direction inside and retained thereby. An output shaft 42B extends from the body section 42A toward the vehicle width direction outside, with the output shaft 42B piercing the motor base 28 and extending toward the vehicle width direction outside of the motor base 28. The motor 42 is drivable such that the output shaft 42B is rotated.

An initial-stage worm 44 made from resin is provided at the vehicle width direction outside of the motor 42, with a vehicle width direction outside end portion of the initial-stage worm 44 rotatably supported by a bottom wall of the case 24. The output shaft 42B of the motor 42 is coaxially inserted into the initial-stage worm 44 from the vehicle width direction inside, with the initial-stage worm 44 being integrally rotated together with the output shaft 42B by rotation of the output shaft 42B.

An output worm 46 made from metal is provided at a lower side of the initial-stage worm 44, with the output worm 46 rotatably supported between the bottom wall of the case 24 and the motor base 28. An initial-stage gear 48 (worm wheel) made from resin is coaxially supported at a vehicle front side of the output worm 46, with the initial-stage gear 48 integrally rotating together with the output worm 46. The initial-stage gear 48 is meshed with the initial-stage worm 44, and the initial-stage gear 48 and the output worm 46 are rotated as a single body by rotation of the initial-stage worm 44.

An output gear 50 (worm wheel) made from metal in a substantially circular cylinder shape and serving as a drive member is provided at a lower side of the output worm 46, with the stand 18 coaxially fitted inside the output gear 50, and the output gear 50 rotatably supported by the stand 18. The output gear 50 is configured so as to be able to move in a vehicle width direction (axial direction) with respect to the stand 18, with the output gear 50 abutted against the support tube 24B of the case 24 from the vehicle width direction inside. The output gear 50 is meshed with the output worm 46 so as to have rotation limited thereby, and the output gear 50 is rotated by the output worm 46 being rotated.

A clutch 52 made from metal in a substantially circular cylinder shape and serving as a transmission member is provided at the vehicle width direction inside of the output gear 50, with the stand 18 fitting coaxially inside the clutch 52 and the clutch 52 supported by the stand 18. The clutch 52 is able to rotate as one with the stand 18, and is also able to move along the axial direction (vehicle width direction) with respect to the stand 18, with the clutch 52 engaging with the output gear 50 and rotated as one with the output gear 50.

A coil spring 54 made from metal and serving as an urging member is provided at the vehicle width direction inside of the clutch 52, with the stand 18 coaxially inserted inside the coil spring 54. A push nut 56 that is made from metal in a substantially circular ring plate shape and serves as an anchor member, is fitted and fixed to the stand 18 at a vicinity of a vehicle width direction inside end portion thereof, with the coil spring 54 spanning between the push nut 56 and the clutch 52. The coil spring 54 is compressed in an axial direction, and the coil spring 54 urges the clutch 52 and the output gear 50 toward the vehicle width direction outside, so as to limit release of the engagement between the output gear 50 and the clutch 52.

Next, description follows regarding operation of the present exemplary embodiment.

In the deflector device 10 configured as described above, in order to deploy the deflector body 14 from the stowed position (the broken line position in FIG. 1), the motor 42 in the drive device 16 is driven in the forward direction and the output shaft 42B, the initial-stage worm 44, the initial-stage gear 48, and the output worm 46 are rotated thereby such that the output gear 50, the clutch 52, and the deflector body 14 (including the stand 18) are rotated as one in the deploy direction A so as to dispose the deflector body 14 in the deployed position (the double-dot broken line position in FIG. 1). The deflector body 14 is thereby disposed at the lower side of the vehicle body 12A and at the vehicle front side of the front wheel 12B of the vehicle 12, suppresses travel-induced wind (airflow) of the vehicle 12 from flowing onto the front wheel 12B (travel-induced wind flowing onto a lower side of the front wheel 12B), thereby suppressing an increase in the air pressure from occurring at the vehicle front side of the front wheel 12B and suppressing vehicle 12 air resistance and lift.

Moreover, in order to stow the deflector body 14 from the deployed position, the motor 42 in the drive device 16 is driven in reverse, and the output shaft 42B, the initial-stage worm 44, the initial-stage gear 48, and the output worm 46 are rotated such that the output gear 50, the clutch 52, and the deflector body 14 (including the stand 18) are rotated as one in the stow direction B so as to dispose the deflector body 14 in the stowed position.

Moreover, when the deflector body 14 has been rotated to the deployed position, the deploy direction A side face of the rotation plate 14A of the deflector body 14 is abutted by the stow direction B side face of the restriction plate 24C of the support body 22 (the case 24), such that the rotation of the rotation plate 14A in the deploy direction A is restricted, and the rotation of the deflector body 14 in the deploy direction A is restricted.

The restriction plate 24C of the case 24 covers a divide between the deflector body 14 and the case 24 (the gap between the seal tube 18A side wall of the stand 18 and the housing tube 24A bottom wall of the case 24). This accordingly enables foreign matter (dirt, for example) to be suppressed from ingression between the deflector body 14 and the case 24 from below by the restriction plate 24C. This in turn enables rotation of the deflector body 14 with respect to the case 24 to be suppressed from being obstructed by the foreign matter.

Moreover, the restriction plate 24C of the case 24 extends as far as the radial direction outside of the seal tube 18A side wall of the stand 18 on a deflector body 14 side (vehicle width direction outside) of the divide between the deflector body 14 and the case 24. This accordingly enables foreign matter to be effectively suppressed from ingression between the deflector body 14 and the case 24 from below by the restriction plate 24C.

Moreover, as described above, the rotation plate 14A of the deflector body 14 is abutted by the restriction plate 24C of the case 24, and further rotation of the deflector body 14 is restricted thereby. This enables rotation of the deflector body 14 to be restricted by the restriction plate 24C, and enables configuration to be simplified.

MODIFIED EXAMPLE

FIG. 6B illustrates a cross-section of a deflector device 60 according to a modified example of the above exemplary embodiment, as viewed from the vehicle width direction inside (a cross-section at the position of line 6-6 of FIG. 4).

As illustrated in FIG. 6B, in the deflector device 60 according to the present modified example, a cover plate 24D having a substantially curved rectangular plate shape and serving as a cover portion is integrally formed to an upper portion of the housing tube 24A on the support body 22 (case 24) of the drive device 16, with the cover plate 24D curved along the circumferential direction of the housing tube 24A. The cover plate 24D protrudes toward the vehicle width direction outside, is disposed in the vicinity of a radial direction outside of the seal tube 18A side wall of the stand 18, and extends as far as a vehicle width direction outside end of the side wall of the seal tube 18A, with the cover plate 24D curved along the seal tube 18A side wall.

Similar operation and advantageous effects to those of the above exemplary embodiment can also be exhibited in the present modified example.

Furthermore, the cover plate 24D of the case 24 covers the divide between the deflector body 14 and the case 24 (the gap between the seal tube 18A side wall of the stand 18 and the housing tube 24A bottom wall of the case 24). This accordingly enables foreign matter (dirt, for example) to be suppressed from ingression between the deflector body 14 and the case 24 from above by the cover plate 24D.

Moreover, the cover plate 24D of the case 24 extends as far as the radial direction outside of the seal tube 18A side wall of the stand 18 on the deflector body 14 side (vehicle width direction outside) of the divide between the deflector body 14 and the case 24. This accordingly enables foreign matter to be effectively suppressed from ingression between the deflector body 14 and the case 24 from above by the cover plate 24D.

Note that in the above exemplary embodiment (including the modified example), the restriction plate 24C and the cover plate 24D (cover portion) are respectively disposed below and above the divide between the deflector body 14 and the case 24. However, the cover portions may also be disposed at the vehicle front side or the vehicle rear side of the divide between the deflector body 14 and the case 24. Moreover, a cover portion may be disposed on the deployment hole 12D side of the cover 12C at the divide between the deflector body 14 and the case 24.

Moreover, in the above exemplary embodiment (including the modified example), the rotation plate 14A is disposed at the vehicle rear side of the divide between the deflector body 14 and the case 24. However, the rotation plate 14A may be disposed at the vehicle front side of, below, or above the divide between the deflector body 14 and the case 24. Moreover, the rotation plate 14A may be disposed at the deployment hole 12D side of the cover 12C at the divide between the deflector body 14 and the case 24. Moreover, in the above modified example, the rotation plate 14A may be abutted by the cover plate 24D of the case 24 such that further rotation of the deflector body 14 is restricted.

Furthermore, in the above exemplary embodiment (including the modified example), the deflector body 14 rotation direction placement range may be freely set for the restriction plate 24C and the cover plate 24D (cover portion), and for the rotation plate 14A. For example, the deflector body 14 rotation direction placement range of the cover portion may be a deflector body 14 rotation angle range of 180° or greater.

Moreover, in the above exemplary embodiment (including the modified example), the rotation plate 14A of the deflector body 14 may be employed to cover the divide between the deflector body 14 and the case 24 (the gap between the seal tube 18A side wall of the stand 18 and the housing tube 24A bottom wall of the case 24). This thereby enables foreign matter (dirt, for example) to be suppressed from ingression between the deflector body 14 and the case 24 by the rotation plate 14A.

Furthermore, in the above exemplary embodiment (including the modified example), the rotation plate 14A of the deflector body 14 may be extended as far as the radial direction outside of the housing tube 24A side face on the case 24 side (vehicle width direction inside) of the divide between the deflector body 14 and the case 24. This accordingly enables foreign matter to be effectively suppressed from ingression between the deflector body 14 and the case 24 by the rotation plate 14A.

Moreover, in the above exemplary embodiment (including the modified example), by disposing the rotation plate 14A of the deflector body 14 above the divide between the deflector body 14 and the case 24, foreign matter is suppressed from ingression between the deflector body 14 and the case 24 from above by the rotation plate 14A.

Furthermore, in the above exemplary embodiment (including the modified example), a configuration may be adopted in which, when the rotation plate 14A of the deflector body 14 is abutted by the cover portion (the restriction plate 24C or the cover plate 24D) of the case 24 such that rotation of the deflector body 14 is restricted, the side face of the rotation plate 14A and the side face of the cover portion are fitted together (in particular placed in face-to-face contact). This accordingly enables foreign matter to be effectively suppressed from ingression between the deflector body 14 and the case 24 by the cover portion and the rotation plate 14A.

Moreover, in the above exemplary embodiment (including the modified example), the rotation plate 14A is provided somewhere else other than on the stand 18 of the deflector body 14. However, the rotation plate 14A may also be provided to the stand 18.

What is claimed is:

1. A deflector device comprising:
    a deflector body configured to be deployed in front of a front wheel of a vehicle by being rotated in a deploy direction to suppress airflow onto the front wheel and configured to be stowed in a vehicle body by being rotated in a stow direction;
    a support body configured to rotatably support the deflector body; and
    a cover portion provided at the support body and covering an entire divide in a rotation axis direction of the deflector body between the deflector body and the support body at at least one of an upper side or a lower side of the entire divide in a rotation radial direction of the deflector body.

2. The deflector device of claim 1, wherein the cover portion restricts rotation of the deflector body.

3. The deflector device of claim 1, wherein the cover portion extends as far as onto a deflector body side of the divide between the deflector body and the support body.

4. The deflector device of claim 1, wherein the cover portion is disposed above the divide between the deflector body and the support body.

5. The deflector device of claim 1, further comprising a rotation portion that covers the divide between the deflector body and the support body and that is rotated by the deflector body being rotated.

6. The deflector device of claim 5, wherein the rotation portion is able to fit together with the cover portion.

7. The deflector device of claim 5, wherein the rotation portion extends as far as onto a support body side of the divide between the deflector body and the support body.

8. The deflector device of claim 5, wherein the rotation portion is disposed above the divide between the deflector body and the support body.

9. The deflector device of claim 1, further comprising a cover that covers a lower face of the vehicle body, that is provided with a deployment hole, the deflector body being deployed through the deployment hole, and the cover portion being disposed at a deployment hole side of the divide between the deflector body and the support body.

10. The deflector device of claim 1, wherein the cover portion is disposed at a vehicle front side of, a vehicle rear side of, or below the divide between the deflector body and the support body.

* * * * *